United States Patent [19]

Goetsch et al.

[11] 4,094,191

[45] June 13, 1978

[54] FUEL PUMP DIAGNOSTICS FOR INTERNAL COMBUSTION ENGINE

[75] Inventors: Henry E. Goetsch, Broadbrook; Henry J. Mercik, Jr., Enfield, both of Conn.

[73] Assignee: United Technologies Corporation, Hartford, Conn.

[21] Appl. No.: 781,095

[22] Filed: Mar. 25, 1977

[51] Int. Cl.² .......................................... G01M 15/00
[52] U.S. Cl. ..................................................... 73/118
[58] Field of Search ....................... 73/117.3, 116, 118

[56] References Cited

U.S. PATENT DOCUMENTS 3,808,882  5/1974  Nick et al. ......................... 73/117.3

OTHER PUBLICATIONS

War Dept. Technical Manual TM1-408 Aircraft Power Plant Operation, Mar. 1944. pp. 9, 10

Primary Examiner—Jerry W. Myracle
Attorney, Agent, or Firm—M. P. Williams

[57] ABSTRACT

A single pressure transducer tapped into the fuel system of an engine, at a point to be responsive to the pressure of the fuel operating against the pressure regulating bypass valve of the fuel system, is used to measure fuel pressure at low idle speed and at high idle speed of the engine; the two pressures when compared against normal pressure can determine bypass valve condition since lower than normal pressure at low idle speed in combination with normal pressure at high idle speed is an indication of a bypass valve which is stuck in the open position, and higher than normal pressure at high idle speed is indication of a bypass valve which is stuck in the closed position. The test can also discern other faults since a lower than normal pressure at high idle speed in combination with a lower than normal pressure at low idle speed is indicative of a bad pump. And, a normal pressure at low idle speed and a lower than normal pressure at high idle speed together are indicative of a filter or other restriction in the line. An exemplary process for making the fuel pressure measurements at two different speeds and a simple illustration of diagnostic analysis of the results thereof are disclosed. Since excessive high idle pressure resulting from the bypass valve being stuck in the closed position will exceed any normal pressure reduction from line restrictions (usually due to dirty filters), even combined faults can be isolated, one at a time.

8 Claims, 5 Drawing Figures

FUEL PUMP DIAGNOSTICS FOR INTERNAL COMBUSTION ENGINE

CROSS REFERENCE TO RELATED APPLICATIONS

The apparatus disclosed herein may utilize a cylinder identification centering means disclosed and claimed in a commonly owned, copending application, Ser. No. 684,221, now U.S. Pat. No. 4,043,189 ENGINE, CYLINDER IDENTIFICATION (CID) TRANSDUCER, filed on May 7, 1976 by Tedeschi, and may determine the number of teeth on a flywheel for speed measurements in accordance with a commonly owned, copending application, Ser. No. 684,037, now U.S. Pat. No. 4,015,466 DETERMINATION OF NUMBER OF TEETH ON AN INTERNAL COMBUSTION ENGINE FLYWHEEL, filed on May 7, 1976 by Stick et al., or Ser. No. 747,755, WAVEFORM COUNT OF TEETH ON AN INTERNAL COMBUSTION ENGINE FLYWHEEL, filed on Dec. 6, 1976 by Pettingell et al.

FIELD OF ART

This invention relates to electronic diagnosis of internal combustion engines, and more particularly to a comprehensive measurement of fuel system operating characteristics of an internal combustion engine.

BACKGROUND OF THE INVENTION

One of the subsystems on a vehicle mounted internal combustion engine is the fuel system. In some forms of diesel engines, for instance, a primary fuel pump distributes fuel in timed relationship to the injectors, the amount of fuel so distributed being controlled by a fuel valve which is operated by linkages responsive to the normal throttle demand (accelerator pedal), the speed governor, and the air/fuel ratio regulator. However, the fuel is normally drawn from the tank and forced through suitable filters by a transfer pump, which may typically comprise a gear pump or the like as is known in the art, the pressure at the output of which is a substantial function of the speed of the pump. In order to provide fuel at desired ranges of pressures to the fuel valve of the primary pump, the transfer pump must have a sufficient capacity at low speeds to provide the required fuel for low speed operation; but since such pumps typically do not have a drooping pressure vs. speed characteristic, such a pump will provide fuel at too high a pressure when it is rotating at high speeds. Therefore, this type of fuel system has a pressure-regulating bypass valve which bypasses fuel back to the tank in sufficient quantity to limit the pressure of the fuel at the inlet to the primary pump fuel valve.

The operating capability of the engine is therefore directly dependent upon a healthy pressure-regulating bypass valve in the fuel system. In the past, it has been known to measure the pressure of fuel at the bypass valve with the engine running at low idle speed; this purports to provide a measure of bypass valve health. However, such a test only determines that the bypass valve is not stuck in the open position which would be indicated by a lower than normal fuel pressure at low idle speed; in fact, such a measurement does not isolate a fault to the bypass valve since, although it is unlikely, a bad transfer pump will also provide low pressure at low idle speed. Further, such a test does nothing to determine that the bypass valve is not stuck in the open position, which would simply provide normal pressure at low idle speed; and if the bypass valve is stuck in some position in between, a single test wouldn't indicate the particular problem, and may not even show up within the test limits utilized.

SUMMARY OF THE INVENTION

Objects of the present invention include comprehensive diagnosis of the fuel system of an engine, and complete diagnosis of the pressure-regulating bypass valve of an engine fuel system.

According to the present invention, the pressure of fuel being provided to a pressure-regulating bypass valve by a transfer pump is measured at low idle speed and at high idle speed to provide indications of health of the fuel system; in further accord with this aspect of the invention, the pressure measurements at high idle speed and low idle speed provide indications of a normal fuel system, or of faults related to the bypass valve being stuck open, the bypass valve being stuck closed, and undue restrictions such as a bad filter, or a faulty pump.

The invention provides a diagnostic capability for testing the health of a fuel system of an engine without removing any of the components from the engine, and in the ordinary, normal dynamic operation, thereby providing complete checks on the intended functional operation of the parts thereof. The invention allows isolating faults of various parts of the fuel system, and allows isolating different faults in the pressure-regulating bypass valve of a fuel system. The invention provides a measure of the health of the fuel pump, filters, fuel lines, and pressure regulating bypass valve of an engine fuel system. The invention may be implemented in a variety of forms as a singular fuel system test or as but one test of many in an overall diagnostic system. The results of measurements made in accordance with the invention may be utilized simply as an aid to a diagnostician, or in automated diagnosis of fault isolation.

The foregoing and other objects, features and advantages of the present invention will become more apparent in the light of the following detailed description of preferred embodiments thereof, as illustrated in the accompanying drawing.

DETAILED DESCRIPTION

Figure 1:
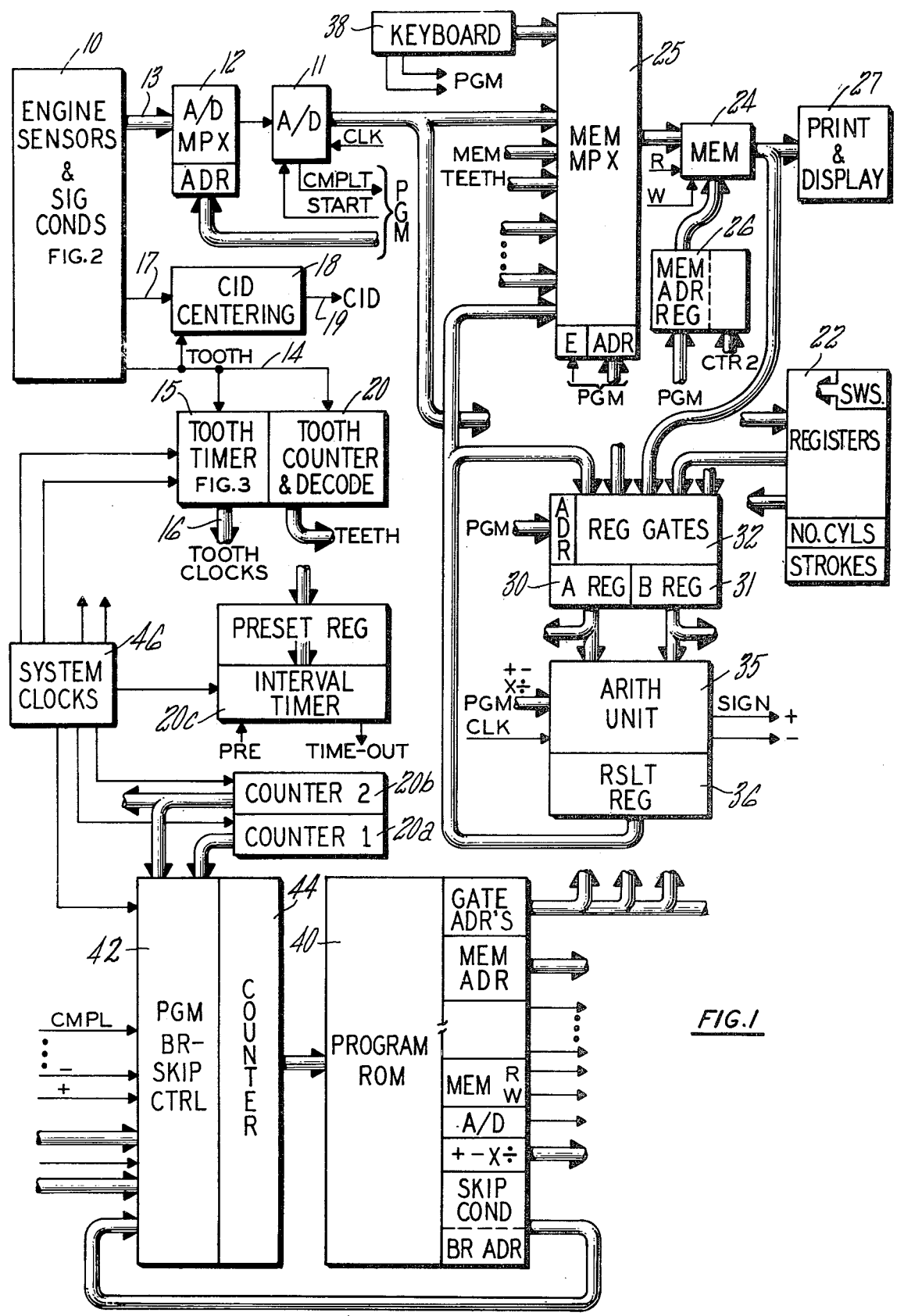
FIG. 1 is a simplified schematic block diagram of a diagnostic system including engine parameter sensing apparatus and exemplary electronic processing apparatus, in which the present invention may be incorporated.

Referring now to FIG. 1, a system which may incorporate the present invention is illustrated as representing the architecture of a typical data processing system or computer together with special purpose apparatus related to an engine diagnostic system of the type in which the invention may be incorporated. Specifically, the system incorporates engine sensors and signal conditioners 10 of a well known type which are adapted to be disposed for response to various parameters or discrete conditions on an engine under test, as described more fully hereinafter. Some of the sensors relate to pressures, temperatures and the like and are therefore analog signals, the magnitude of which is a measure of the parameter being sensed. These outputs of the sensors are fed over lines 13 to an analog to digital converter (A/D) 11 when selected by an A/D multiplexer 12 in response to a particular sensor address applied thereto by the program of the data processor. In addition, a tooth sensor may sense the passage of teeth on the flywheel of the engine to provide a tooth signal on a line 14, the intertooth time interval of which (when the engine is running) is measured by a tooth timer 15 and provided on tooth count lines 16. Another discrete signal is a cylinder or cycle identification signal (CID) on a line 17 which is applied to a CID centering circuit 18 to provide a CID signal on a line 19. The raw CID signal on the line 17 is a signal from a proximity sensor disposed to sense movement of an engine member once in each cycle of the engine, such as the rocker arm for the intake valve of one of the cylinders or a cam, if desired; this provides information of the cylinder-by-cylinder position of the engine at any moment in time in the same fashion as the number one firing in a spark ignition engine, and also provides cycle-to-cycle division of the engine's angular position as it is running or cranking.

In accordance with the invention, the parameters of the engine as provided through the A/D converter 11, and the instantaneous position information with respect to the engine as provided by the CID signal on the line 17 and the tooth signals on the line 14 may be used in diagnosis of the engine in accordance with the invention herein.

Additional special apparatus which may be used (although as described hereinafter is not necessarily required) includes a tooth counter and decode circuit 20, and a pair of counters 20a, 20b referred to as counter 1 and counter 2, and an interval timer 20c, and special purpose registers 22, which may be used (as an alternative to memory) to retain certain factors that are used so often as to render it advisable to have them directly available to the program rather than having to access them in memory, in order to cut down processing time and complexity of programming. Such registers may contain factors utilized in processing data (such as multiplicands used in digital filtering of the data and the like) and information relating to the particular engine under test (such as number of strokes and cylinders) which may be entered by switches manipulated by an operator, the switches feeding binary decode circuits such that the decode constantly reflects the position of the switch on a steady state basis in the manner of a register.

The remainder of FIG. 1 is illustrative of one type of data processing apparatus, which is shown for illustrative purposes herein since it is a type that may be advantageous for use where general purpose programming is not required, but rather limited functions are to be performed. A computer, as is known in the art, includes memory (or accessible storage), and arithmetic unit, program control, and the necessary gates, data flow and event decode or monitoring circuits so as to permit advancing logically through the steps which are to be performed. Specifically, a memory 24 may be loaded from a variety of inputs shown on the data flow under control of a memory multiplexer 25 which is enabled and addressed by the program so as to select which of the possible inputs to memory are to be applied thereto, if any. The memory 24 is responsive to a memory address register 26 which may respond to a counter used in program control in a usual fashion. The output of the memory is available to other portions of the data flow, such as print and display apparatus 27 and the arithmetic apparatus including arithmetic unit input registers, referred to herein as an A register 30 and a B register 31 under control of register gates 32 which are controlled by the program in a known fashion. Herein, the output of the A register and the B register is available to the register gates 32 and to the main data flow, so that their contents may be moved between the registers 30, 31 or to the memory 24. This is to facilitate the particular type of processing which may be employed in an engine diagnostic system, as is described more fully hereinafter. The registers 30, 31 feed an arithmetic unit of a known type 35, the function of which, controlled by the program, is to add, subtract, multiply or divide, to provide answers to a result register 36 as well as providing indications of the sign of the result. As indicated in FIG. 1, the result register may be available at the input to the arithmetic unit through the gates 32; alternatively, as is common in many computers the result register could be automatically one of the inputs of the arithmetic unit, and it can be loaded directly from the memory upon a proper command.

In order to provide data inputs to the memory for initialization and to permit a degree of control over the system during processing, a keyboard 38 of a usual variety may be provided. In addition to data inputs, the keyboard may have control function keys that permit choice to the operator of loading memory from the result register or of loading memory in response to the keyboard, depending upon conditions which may be displayed in the print and display apparatus 27.

For the rather limited number of tests being performed in apparatus incorporating the present invention, the program may be controlled in a variety of ways. One way is a program ROM 40 which provides input gate addresses to control the inputs to the memory, the arithmetic input registers, and the A/D converter, etc.; the memory address; the functions to be performed by the arithmetic unit, and other commands such as commands to the memory to cause it to read or write, and to start the A/D converter 11, and the like. Sequencing is controlled by unconditional branch instructions (which provide a branch address) and by skip instructions (dependent on conditions) provided by a branch/skip control 42 at the input to the program counter 44, which is also responsive to system clocks 46. Thus, as is known, for each program clock signal received from the system clocks, the program counter may be advanced, skipped one or twice, or reset to the branch address, in dependence upon the presence of branch or skip instructions.

It should be understood that the particular processing apparatus used, and the degree of use of special purpose apparatus, is dependent upon the particular implementation of the present invention which is to be made, and forms no part of the present invention. If the invention is utilized in a complex, sophisticated diagnostic system in which a variety of diagnostic functions are required, then the type of apparatus selected for processing may be more sophisticated and capable of general purpose utilization in order to accommodate the special requirements of all of the diagnostic procedures to be performed. However, the cost of programming complexity of such a processing system may be unwarranted in a diagnostic system which performs either relatively few or relatively simple tests. As is more apparent in the light of detailed operational descriptions hereinafter, well known processing systems (such as NOVA and PDP/11) employing only programs provided through techniques well known in the art, may be utilized in conjunction with the engine sensors and conditioners 10, suitable input and output apparatus (such as keyboard 38 and the print and display apparatus 27) and, depending on the processing power of the data processing system selected, some special purpose hardware which may be found advisable, such as the tooth timer 15, the tooth counter 20 and some special registers 22. However, the well known processing systems referred to hereinbefore can provide adequate memory capacity to perform the tooth timing and counting functions, and to provide for the storage of all required parameters and engine information in the memory, as is readily apparent to those skilled in the art.

Figure 2:
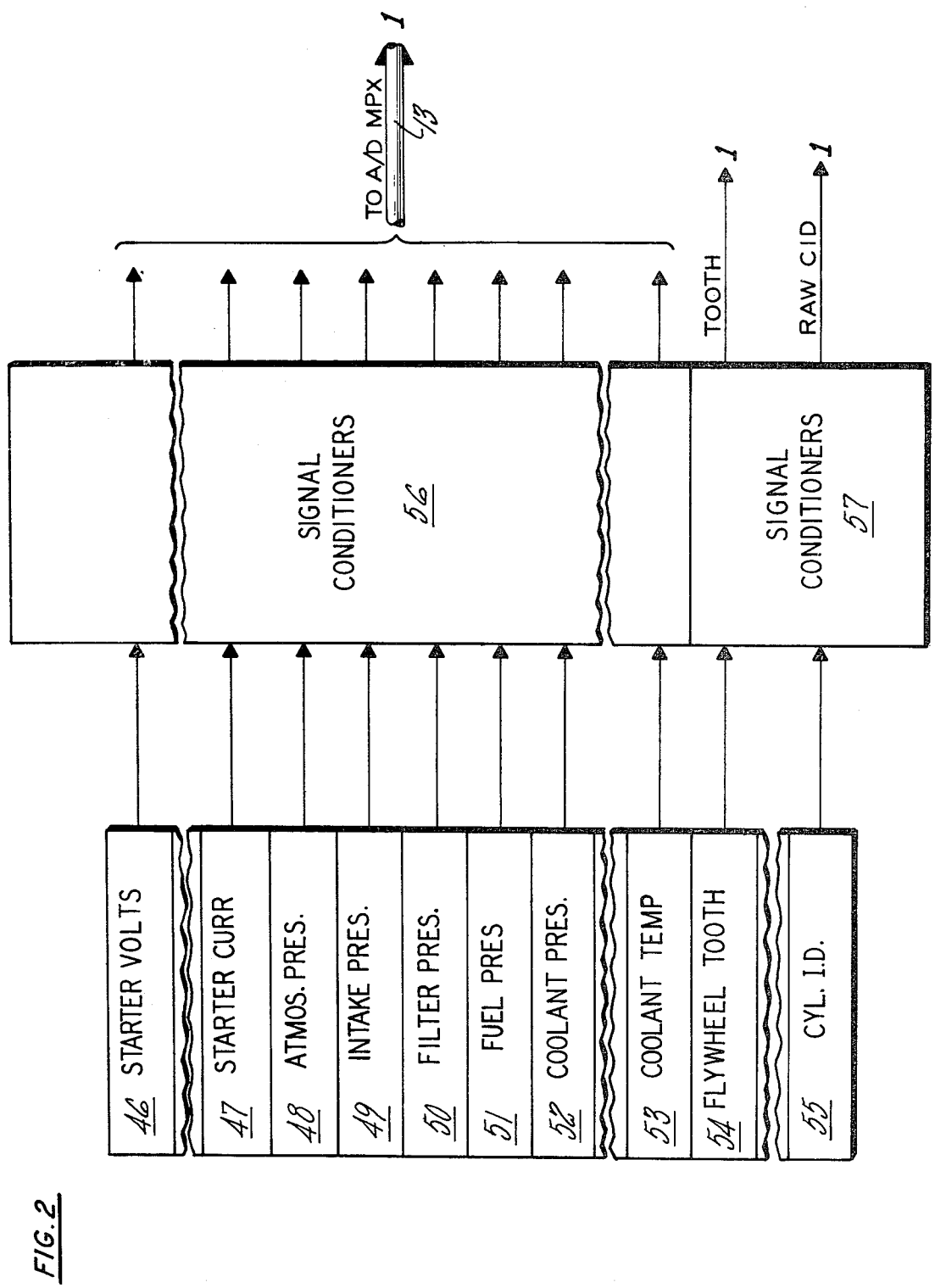
FIG. 2 is a simplified block diagram of engine parameter sensing apparatus for use in the embodiment of FIG. 1.

Referring now to FIG. 2, a plurality of engine sensors in a diagnostic system incorporating the present invention may include, among others not shown in FIG. 2, a starter voltage probe or clamp 46, a starter current probe 47, an atmospheric pressure transducer 48, which could be disposed in general proximity to the engine under test, a pressure transducer 49 to measure the intake manifold air pressure, a filter pressure transducer 50 to measure the pressure of the fuel downstream of the fuel inlet filter, a fuel pressure transducer 51 to measure the pressure at the fuel injector inlet rail of the engine, a coolant pressure transducer 52 which may preferably measure the pressure of coolant at the inlet to the coolant thermostat, a coolant temperature transducer 53 to measure coolant temperature, preferably at the inlet to the thermostat. In a diagnostic system incorporating the present invention there may also be a proximity sensor 54, which may comprise an RGT Model 3010-AN Magnetic Proximity Sensor, provided by Electro Corporation, Sarasota, Florida, for sensing the passage of flywheel teeth past a particular point adjacent to the flywheel housing, and a proximity sensor 55 such as a Model 4947 Proximity Switch distributed by Electro Corporation, for sensing the presence of an engine member which moves in a unique fashion once in each cycle of the engine, which is one revolution in a two stroke engine or two revolutions in a four stroke engine. The proximity sensor 55 may preferably be mounted through the valve cover adjacent to a rocker arm related to the intake valve of one of the cylinders of the engine, thereby to provide information as to the particular point of an engine cycle once in each cycle, as well as to delineate successive engine cycles as the engine is rotating.

Each of the sensors of FIG. 2 is applied to a suitable one of a plurality of signal conditioners 56, 57 to filter out unwanted noise, and to provide, through an amplifier, suitable level adjusting as is appropriate for the circuitry being fed thereby. For instance, the signal conditioners 56 scale the signals to the proper level so that each of them can be fed through a common A/D converter 12 (FIG. 1). The signal conditioners 56, 57 can be suitable ones of a wide variety known in the art, and form no part of the present invention.

Figure 3:
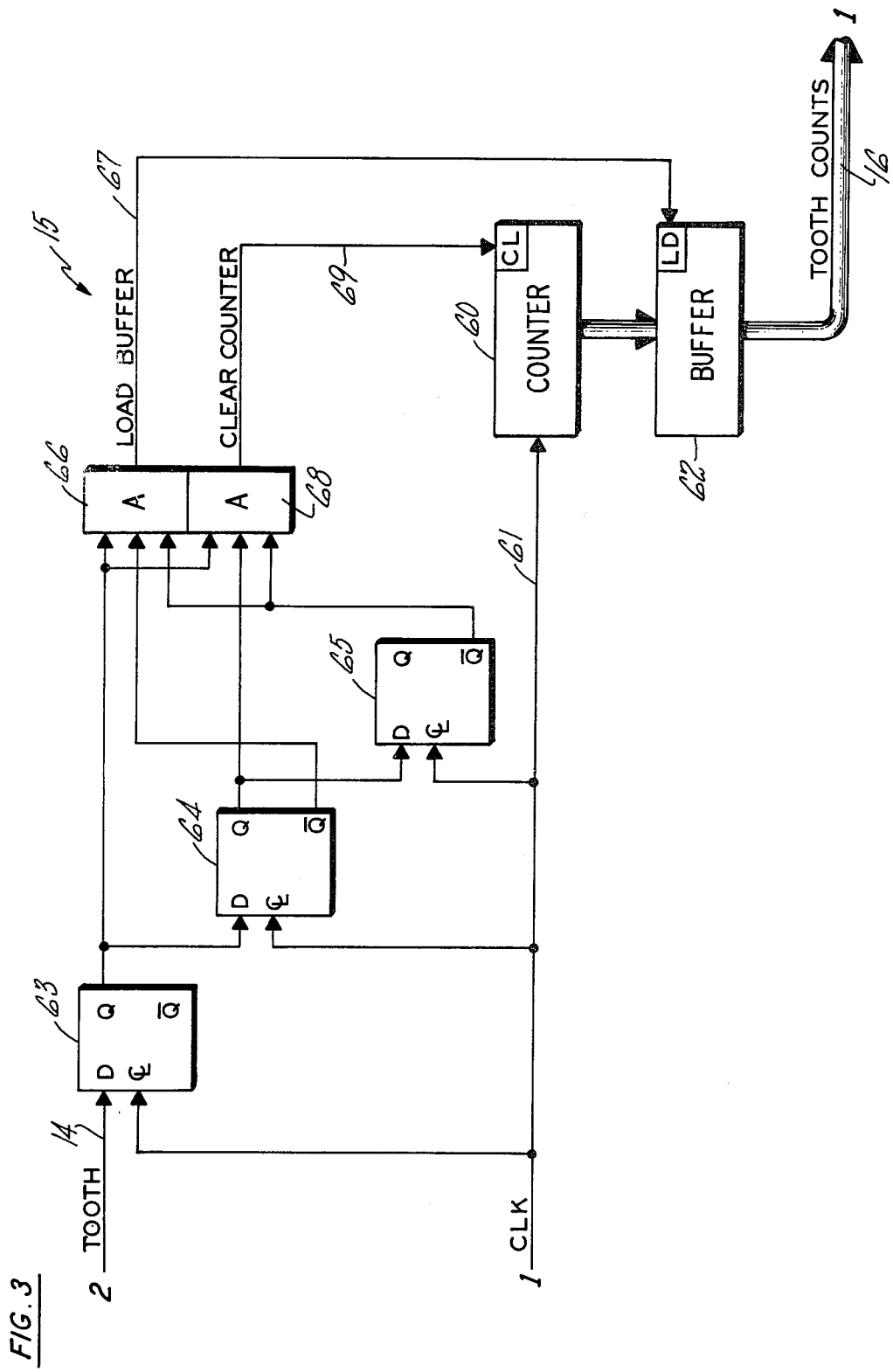
FIG. 3 is a simplified schematic diagram of tooth timer means for obtaining instantaneous, sub-cyclic engine speed in the embodiment of FIG. 1.

Referring now to FIG. 3, the tooth timer 15 includes a counter 60 which repetitively counts clock pulses on a line 61 that may be supplied by system clocks 46 in FIG. 1. The counter is parallel-fed to a buffer 62, the output of which comprises the tooth counts. The counter is running substantially all of the time since a very high frequency clock signal can be utilized on the line 61 (anywhere from tens of KHz to tens of MHz) whereas at speeds from 300 to 2,000 rpm the frequency of the tooth signals on the line 14 may be on the order of 10 to 100 Hz, depending upon the number of teeth. Thus the few clock signals lost during the tooth to tooth resetting of the counter are miniscule.

Each time that a tooth signal appears on the line 14, the next clock signal will set a D-type flip flop 63, the Q output of which is applied to a D-type flip flop 64. The second clock signal following the tooth signal therefore sets the D-type flip flop 64, and since its Q output is applied to a D-type flip flop 65 the third clock signal will cause it to become set. The very first clock signal, after the appearance of the tooth signal, is decoded by an AND circuit 66 since it responds to Q of flip flop 63 and not Q of flip flops 64 and 65; this provides a load buffer signal on a line 67 to cause the buffer 62 to be loaded in parallel from the counter 60. The second clock signal following the appearance of the tooth signal will cause an AND circuit 68 to respond to the Q of flip flops 63 and 64 and the not Q of flip flop 65 so as to generate a clear counter signal on a line 69 which is applied to the clear input of the counter 60 causing it to be cleared to zero. The third clock signal, by setting the flip flop 65, simply eliminates the clear counter signal on the line 69 so that the next leading edge of the clock signal and all subsequent clock signals will be counter in the counter 60. Whenever the tooth signal disappears, (which is totally immaterial) the next three clock signals in a row will cause resetting of the flip flops 63–65, in turn, since each of their D inputs will go down. The counter and the buffer are independent of the resetting of the flip flops 63–65 since both AND circuits 66, 68 operate only during a progression with flip flop 63 on and flip flop 65 off, which does not occur during the resetting of the flip flops.

Thus the tooth timer 15 provides tooth counts on the line 16 which are stable, throughout substantially each intertooth interval. The processing apparatus of FIG. 1 may therefore sample the tooth counts at random. The tooth timer 15 thereby provides very accurate, subcyclic speed measurement, on a tooth to tooth basis, which provides speed indications many times within each individual cylinder stroke portion of each engine cycle.

In the detailed description of exemplary processing hereinafter, the term "ringgear" is sometimes used in place of "flywheel"; they mean the same thing; the abbreviation "RGT" means "ringgear teeth", a stored factor indicating the number of teeth on the flywheel of the engine under test. This may be determined and entered from engine specifications, or as set forth in a commonly owned copending application of Stick et al., Ser. No. 684,037, entitled DETERMINATION OF NUMBER OF TEETH ON AN INTERNAL COMBUSTION ENGINE FLYWHEEL. Other abbreviations include: "RSLT" = result register; "MEM" = memory; "Ctr" = counter; "Factor" means a memory location or a register where the factor is available; "CMPLT" means A/D conversion is completed; "spd" means speed; and other abbreviations are apparent in the drawing. Parentheticals after "MEM", such as "(Freq)" indicate addresses, chosen at will by the programmer, or partially determined by counter two, if so indicated.

Figure 4:
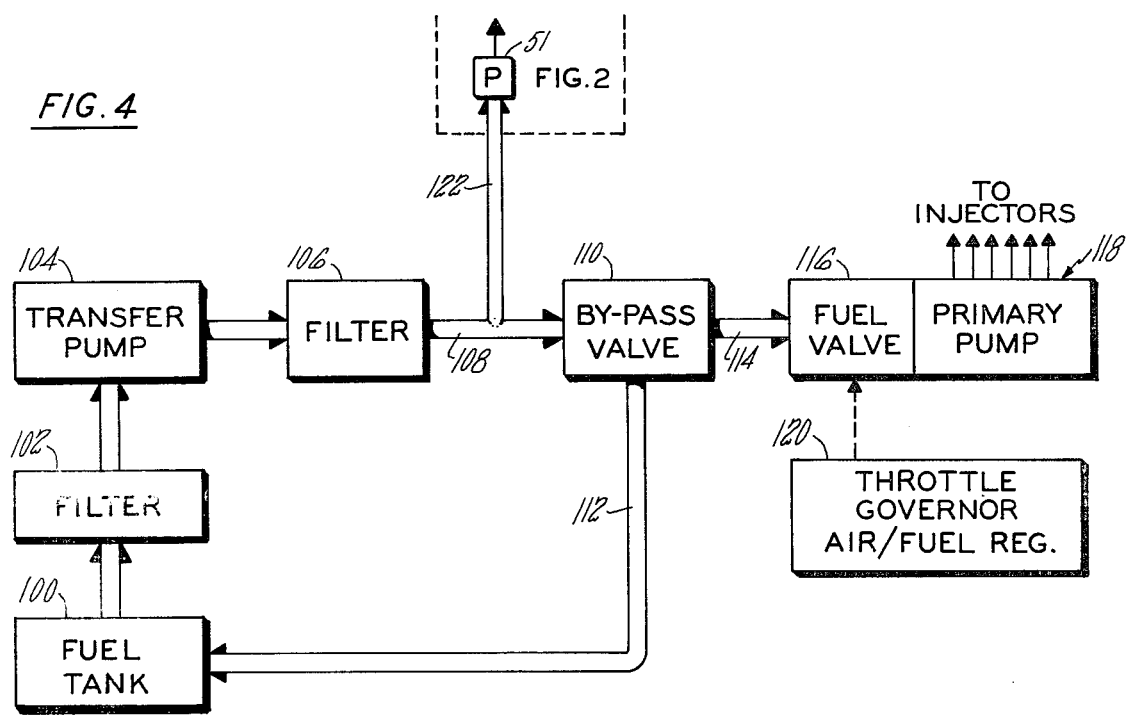
FIG. 4 is a simplified block illustration of a bypass fuel system with which the present invention may be utilized.

Referring now to FIG. 4, one type of fuel system which is commonly used in some forms of diesel engines is illustrated in an exemplary, simplified block form. Therein, fuel is drawn from a fuel tank 100 through a first filter 102 by a transfer pump 104 that passes the fuel through a second filter 106 through a passage 108 to a bypass valve 110 which is normally in the nature of a pressure relief valve such that fuel is bypassed through a line 112 back to the tank 100 in whatever quantity is required for equilibrium between a pressure spring on the valve and the pressure of the fuel at the bypass valve 110. The pressurized fuel in the bypass valve 110 is transferred by a passage 114 into the fuel valve portion 116 of a primary pump 118 which distributes the fuel separately, in relationship timed to the rotation of the engine, to the fuel injectors of the engine. The fuel valve 116 is controlled as to the amount of fuel to be distributed by the primary pump 118, by means of linkage 120 which includes the normal throttle linkage, and the controls thereover such as the speed limit of the governor and the low pressure air limit on fuel which is controlled by the air/fuel ratio regulator.

In accordance with the invention, the pressure which the fuel at the bypass valve 110 may assume is measured by the fuel pressure regulator 51 (FIG. 2) which is connected by a tap 122 in a fashion to permit monitoring the pressure at the fuel bypass valve 110, such as at the passage 108.

Figure 5:
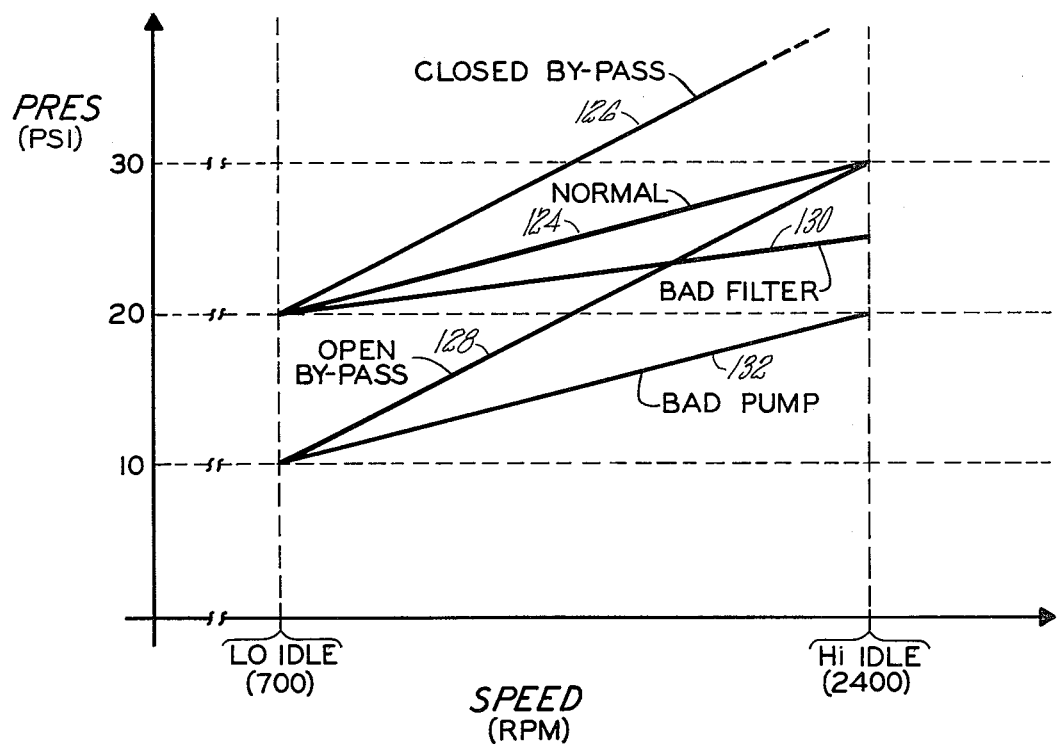
FIG. 5 is a simplified illustration of the diagnostic concepts of the measurements of the invention.

The diagnostic measurement of various parameters of the fuel system by measuring the fuel pressure is illustrated in FIG. 5. The illustration of FIG. 5 is over-simplified taking 700 rpm as a low idle speed, 2400 rpm as a high idle speed, 20 psi as a normal low idle speed fuel pressure and 30 psi as a normal high idle speed fuel pressure. Quite obviously, the speeds and the particular pressures involved are not germane to the practice of the present invention, they being adjusted to suit the design parameters of any engine under test. In FIG. 5, a line 124 connects the normal low idle pressure with the normal high idle pressure (the line itself having no meaning except to indicate the two pressures of a normal system). This is to be expected, since the transfer pump 104 (FIG. 4) is typically a gear pump, the output pressure of which is very nearly linearly related to the speed thereof. And, if there are no undue filter blockages, and if the bypass valve is operating normally so as to allow full pressure at low speed, but to limit the pressure at high speed, then normal low idle and high idle pressures of 20 and 30 psi (in the simplistic example herein) are to be expected. If the pump is normal, but the bypass valve 110 fails to operate in performance of its intended function, it will allow the pressure at the inlet to the fuel valve 116 to become excessive, as indicated by a line 126. On the other hand, if the bypass valve is stuck in an open position, it will continuously bypass fuel, even when the fuel pressure is low, so that the transfer pump 104 cannot keep up with it; this results in a lower than desired pressure at low speeds, but since the bypass valve is normally open at high speeds, it results in a normal pressure at high idle speed, all of which is indicated by the line 128. As is shown, if the pump is good but there are excessive restrictions in the fuel lines, such as might occur from plugged filters, then the pressure might be normal under low fuel flow conditions (low speed) but the pressure may not build up to a desirable full pressure at high speeds, as indicated by a line 130. And finally, if the pump is bad (which isn't too likely to happen) the chances are that the pressure will always be lower than it should be for any speed, as indicated by a line 132.

From the foregoing analysis, in the simplified fashion, with respect to FIG. 5, it can be seen that for any given engine, the pressure in the fuel line at low idle together with the pressure in the fuel line at high idle will provide a very good measure of the health or operating conditions of the fuel system of the engine, without requiring the fuel system parts to be removed from the engine for bench tests, calibration and the like. Similarly, the simple measurement in accordance with the invention provides not only an indication of whether the fuel system is operating in a normal fashion or is operating abnormally, but can isolate abnormal conditions to any one of four likely faults.

To perform the measurements of the present invention, various factors may be required. For instance, the desired speeds may relate to the particular engine under test, as may the rated or normal low idle fuel pressure and high idle fuel pressure of the engine. Similarly, if one were to perform automatic diagnostic analysis of the measurements, as in accordance with the invention in one form, the limits to be used for comparing actual measurements against rated measurements must also be made available to the processing apparatus.

The speed measurements are made herein by the tooth sensor 54 and tooth timer 15, which sense the passage of teeth and record a count of the number of clock signals fed to the counter on a tooth-to-tooth basis. The number of flywheel or ringgear teeth (RGT) can be determined from manufacturer's specifications and provided in either a register or a predetermined location in memory prior to the test. Or, if desired, the teachings of either the aforementioned Stick et al. or Pettingell et al. applications may be utilized to determine the number of ringgear teeth on the flywheel and made available in memory; none of this forms any part of the present invention. The fraction of a revolution traversed as each tooth passes the sensor is simply the ratio of one divided by the total number of teeth. The time for that fraction of a revolution to occur is simply the counts of the interval timer divided by the frequency of clock signals fed to the interval timer. Since frequency of the clock feeding the counter is expressed in Hz, and speed is normally expressed in revolutions per minute, a factor of 60 must be employed in a well known fashion. To actually determine the speed from the counts provided by the tooth counter the relationship is the ratio of one tooth to the total number of teeth, which is divided by the ratio of the counts to the frequency (the frequency in turn having to be first divided by 60 to yield a result in rpm's). When comparing the actual speed of the engine as determined by the tooth timer with predetermined speeds (such as low idle and high idle speeds herein), the position of speed and counts in the relationship described hereinbefore can be reversed, and the number of counts which the tooth timer will have when the engine has a predetermined speed can be precalculated and ready to use. This is done generally by multiplying the frequency of the clock times 60, all of which is divided by the product of the total number of teeth on the flywheel and the desired starting speed in rpm. This can be accomplished in the exemplary diagnostic system of FIG. 1, assuming the specification speeds (low idle of about 700 rpm with a window of 600–800 rpm, and high idle of about 2400 rpm, tested for excess of 2200 rpm) are available in memory.

1. Display "Lo Spd"
2. Load MEM (Freq) to A REG
3. Load MEM (RGT) to B REG
4. Divide
5. Load RSLT to A REG
6. Load MEM (800 RPM) to B REG
7. Divide
8. Load RSLT to A REG
9. Load 60 Factor to B REG
10. Multiply
11. Load RSLT to B REG
12. Load Tooth timer to A REG
13. Subtract
14. Skip one if +
15. Branch to 1

And then a second test is made at a lower rpm which is taken herein to be on the order of 600 rpm as follows:

16. Load MEM (Freq) to A REG
17. Load MEM (RGT) to B REG
18. Divide
19. Load RSLT to A REG
20. Load MEM (600 RPM) to B REG
21. Divide
22. Load RSLT to A REG
23. Load 60 Factor to B REG
24. Multiply
25. Load RSLT to B REG
26. Load Tooth timer to A REG
27. Subtract; Skip one if −
28. Branch to 1

Having determined that the speed is at low idle, the system can now measure the low idle speed fuel pressure as follows:

29. Turn off "Lo Spd"
30. A/D MPX to Fuel Pres
31. Start A/D
32. Skip one if CMPLT
33. Branch to 31
34. Load A/D to MEM (P-Lo)
35. Display "Hi Spd"

The last instruction is simply indicative of instructions which may be used to indicate to the operator that the low speed test is completed and that he can force the engine to accelerate to high idle for the next test. However, since the electronic processing herein is so fast, there is no need of this: the operator can simply allow the engine to settle at low idle, leave it for a second or so, and then force it to accelerate to high idle. The system will then check to see that the engine is at high idle in a manner similar to that described hereinbefore, except this time it only tests for an excess of rated speed, as follows:

36. Load MEM (Freq) to A REG
37. Load MEM (RGT) to B REG
38. Divide
39. Load RSLT to A REG
40. Load MEM (2200 RPM) to B REG
41. Divide
42. Load RSLT to A REG
43. Load 60 Factor to B REG
44. Multiply
45. Load RSLT to B REG
46. Load Tooth timer to A REG
47. Subtract
48. Skip one if −
49. Branch to 46

Having checked to see that the engine is idling above rated speed, the system will now measure fuel pressure as before:

50. Turn off "Hi Spd"
51. A/D MPX to Fuel Pres
52. Start A/D
53. Skip one if CMPLT
54. Branch to 31
55. Load A/D to MEM (P-Hi)

Now the measurement is complete, the fuel pressure measured at both low idle and high idle speeds have been made available to storage. Thereafter, such use as is desired of these measurements can be made, within the present invention. For instance, if the processing apparatus of FIG. 1 causes the pressures to be displayed or printed as a diagnostic output, an operator can determine (from the factors described with respect to FIG. 5 hereinbefore) whether the fuel system is normal, or whether one of the four indicated likely faults has probably been manifested. On the other hand, as an aid to such operator, or for further diagnostic procedures, the pressure difference can be measured at this time as follows:

56. Load A/D to A REG
57. Load MEM (P-Hi) to A REG
58. Subtract
59. Load RSLT to MEM (P-difference)

Thereafter, such use as is desired can be made of the pressures and the pressure difference. For instance, the pressures could be compared against standards which have been empirically determined for the type of engine under test, to give an indication of passage or failure. On the other hand, the diagnostician can simply look at the pressures and from the precepts of FIG. 5 analyze the condition of the fuel pump, the filters and the fuel bypass valve.

On the other hand, automated analysis in accordance with the precepts of FIG. 5, may be provided, if desired. An extremely simple, exemplary process may first test the low idle pressure to see if it is below normal, if it is, then test the high idle pressure to see if it is low, indicating a bad pump, or if it is normal, indicating that the bypass valve is stuck open. But if the low idle pressure is not below normal, then the high idle pressure is tested to see if it is low, indicating a bad filter; high, indicating a bypass valve which is stuck closed; or normal, which together would indicate that the system is all normal. This may be in accordance with the following exemplary instructions:

60. Load MEM (Rated P-Lo) to A REG
61. Load MEM (2 psi) to B REG
62. Subtract
63. Load RSLT to B REG
64. Load MEM (P-Lo) to A REG
65. Subtract
66. Skip 1 if −
67. Branch to 79
68. Load MEM (Rated P-Hi) to A REG
69. Load MEM (2 psi) to B REG
70. Subtract
71. Load RSLT to A REG
72. Load MEM (P-Hi) to B REG
73. Subtract
74. Skip 2 if −
75. Display "Bad Pump"
76. Branch to 98

77. Display "Open"
78. Branch to 98
79. Load MEM (Rated P-Hi) to A REG
80. Load MEM (2 psi) to B REG
81. Subtract
82. Load RSLT to A REG
83. Load MEM (P-Hi) to B REG
84. Subtract
85. Skip 2 if −
86. Display "Filter"
87. Branch to 98
88. Load MEM (Rated P-Hi) to A REG
89. Load MEM (2 psi) to B REG
90. Subtract
91. Load RSLT to B REG
92. Load MEM (P-Hi) to A REG
93. Subtract
94. Skip 2 if −
95. Display "Closed"
96. Branch to 98
97. Display "Normal"
98. End Operation It should be understood that the particular processing apparatus and the exemplary program steps therefor set out hereinbefore form no part of the present invention. The high and low speed tests may be made in either order; and several of each may be averaged. The invention may be implemented in a wide variety of ways well within the skill of the art. For instance, tests of this type, if not being performed in an overall diagnostic system of the general type described with respect to FIG. 1 hereinbefore, may be more practical to implement with analog measuring apparatus. But if a high degree of resolution and sophistication is desired, then the digital techniques described herein may be preferable. Obviously, the present test alone could be performed with special purpose digital equipment which is far simpler than the overall system described hereinbefore. Similarly, although the invention has been shown and described with respect to exemplary embodiments thereof, it should be understood by those skilled in the art that the foregoing and various other changes, omissions and additions in the form and detail thereof, may be made therein and thereto without departing from the spirit and the scope of the invention.

Having thus described typical embodiments of our invention, that which we claim as new and desire to secure by Letters Patent of the United States is:

1. In a method of diagnosing an engine fuel system of the type having a fuel pressure-regulating bypass valve, which is normally closed to provide fuel at full pump pressure at low speeds, and opens proportionally to bypass fuel to limit the pressure thereof at higher speeds, the steps of:
   operating the engine at substantially a low idle speed and at substantially a high idle speed;
   at each of said speeds, measuring the pressure of fuel provided to the bypass valve by a pump; and
   providing a manifestation of the fact that the bypass valve is stuck in the open position if the pressure measured at said high idle speed is substantially the normal rated high idle speed fuel pressure for the engine under test and the pressure measured at said low idle speed is lower than the normal rated low idle speed fuel pressure for the engine under test.

2. In the method according to claim 1, the additional step of:
   providing a manifestation of the bypass valve being stuck in the closed position if the pressure measured at said high idle speed is in excess of a normal rated high idle speed fuel pressure for the engine under test.

3. In the method according to claim 2, the additional steps of:
   providing a manifestation of a faulty pump if both of said measurements indicate pressures lower than the normal rated fuel pressures for the engine under test; and
   providing a manifestation of a fuel line restriction if the pressure measured at said low idle speed is substantially the normal rated low idle speed fuel pressure for the engine under test and the pressure measured at said high idle speed is lower than the normal rated high idle fuel speed pressure for the engine under test.

4. Apparatus for diagnosing an engine fuel system of the type having a pump feeding a pressure-regulating bypass valve which normally allows utilization of fuel at the full pump pressure at low speeds, and in response to increasing pressure, bypasses fuel so as to limit the fuel pressure at higher speeds, comprising:
   pressure sensor means adapted to be disposed to sense the pressure to the bypass valve by the pump of the engine, and providing a pressure signal in response thereto;
   speed sensor means including means adapted to be disposed to sense rotation of the engine, for providing a speed signal indicative of the rotary speed of the engine; and
   processing apparatus operative with all of said sensor means disposed with respect to the engine as described hereinbefore for respectively determining in response to said speed signal that the engine is operating at a speed in a range including substantially a low idle speed in one case and for determining that the engine is operating at substantially a high idle speed in another case, and, in response thereto, providing in each case, in response to said pressure signal, a pressure manifestation indicative of the fuel pressure at the inlet to the fuel pressure-regulating bypass valve of the engine, respectively corresponding to the high idle speed and to the low idle speed.

5. Apparatus according to claim 4 wherein said processing apparatus comprises:
   means for providing a manifestation of rated high idle speed fuel pressure for the engine under test, for comparing said rated high idle speed fuel pressure manifestation with said manifestation of fuel pressure provided in the case of high idle speed. and for providing a manifestation indicating that the fuel pressure-regulating bypass valve is stuck in the closed position in the event that the pressure indicated by the fuel pressure manifestation related to high idle speed exceeds the pressure indicated by the rated high idle speed fuel pressure manifestation.

6. Apparatus according to claim 4 wherein said processing apparatus comprises:
   means for providing a manifestation of rated high idle speed fuel pressure and rated low idle speed fuel pressure for engine under test, for comparing said rated manifestations with said measured manifestations of fuel pressure, and for providing a manifestation indicating that the fuel pressure-regulating bypass valve is stuck in the open position in the event that the pressure manifestation related to the pressure measurement in the high idle speed case indicates a pressure substantially the same as the pressure indicated by said rated high idle speed fuel pressure manifestation and the pressure indicated by the measured pressure manifestation in the low idle speed case indicates a pressure lower than the pressure indicated by said rated low idle speed fuel pressure manifestation.

7. Apparatus according to claim 6 wherein said processing apparatus comprises:

means for providing a manifestation indicating that the fuel pressure-regulating bypass valve is stuck in the closed position in the event that the pressure indicated by the measured pressure manifestation in the high idle speed case exceeds the pressure indicated by the rated high idle speed fuel pressure manifestation.

8. Apparatus according to claim 7 wherein said processing apparatus comprises:

means providing a manifestation indicative of a faulty pump if both of said measured pressure manifestations indicate pressures lower than both of said rated pressure manifestations, and providing a manifestation indicative of a fuel line restriction if the pressure indicated by the measured pressure manifestation in the low idle speed case is substantially the same as the pressure indicated by said rated low idle speed pressure manifestation and the pressure indicated by the measured pressure manifestation relating to the high idle speed case is lower than the pressure indicated by said rated high idle speed pressure manifestation.

* * * * *

UNITED STATES PATENT AND TRADEMARK OFFICE
CERTIFICATE OF CORRECTION

PATENT NO. : 4,094,191
DATED : June 13, 1978
INVENTOR(S) : Henry E. Goetsch and Henry J. Mercik, Jr.

It is certified that error appears in the above-identified patent and that said Letters Patent are hereby corrected as shown below:

Column 1, line 68  "open" should read --closed--

Column 4, line 29  "of" (2nd occurrence) should read --to--

Column 4, line 53  "by" should read --to--

Column 4, line 58  "one" should read --once--

Column 6, line 34  "counter" should read --counted--

Column 7, line 9   "first filter" should read --first fuel filter--

Column 7, line 65  "shown" should read --known--

Column 12, line 26 "pressure to" should read --pressure provided to--

Column 12, line 53 "." should read --,--

UNITED STATES PATENT AND TRADEMARK OFFICE
CERTIFICATE OF CORRECTION

PATENT NO. : 4,094,191
DATED : June 13, 1978
INVENTOR(S) : Henry E. Goetsch and Henry J. Mercik, Jr.

It is certified that error appears in the above-identified patent and that said Letters Patent are hereby corrected as shown below:

Column 12, line 65 "for engine" should read --for the engine--

Column 13, line 2 "related" should read --relating--

Signed and Sealed this

Sixth Day of February 1979

[SEAL]

Attest:

RUTH C. MASON
*Attesting Officer*

DONALD W. BANNER
*Commissioner of Patents and Trademarks*